(12) United States Patent
Doblar et al.

(10) Patent No.: US 7,139,308 B2
(45) Date of Patent: Nov. 21, 2006

(54) SOURCE SYNCHRONOUS BUS REPEATER

(75) Inventors: Drew G. Doblar, San Jose, CA (US); Jyh-Ming Jong, Saratoga, CA (US); Brian L. Smith, Sunnyvale, CA (US); Jurgen Schulz, Pleasanton, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 800 days.

(21) Appl. No.: 10/117,427

(22) Filed: Apr. 5, 2002

(65) Prior Publication Data

US 2003/0189973 A1 Oct. 9, 2003

(51) Int. Cl.
*H04L 25/60* (2006.01)

(52) U.S. Cl. ............ 375/215; 375/214; 375/354; 326/93

(58) Field of Classification Search ........ 375/215, 375/226, 373, 93, 211, 213, 214, 219, 220, 375/354, 356; 37/372; 370/279, 293, 315; 326/93

See application file for complete search history.

(56) References Cited

U.S. PATENT DOCUMENTS

| | | |
|---|---|---|
| 4,665,518 A | 5/1987 | Champlin et al. |
| 6,178,206 B1 | 1/2001 | Kelly et al. |
| 6,199,135 B1 | 3/2001 | Maahs et al. |
| 6,219,396 B1 * | 4/2001 | Owada ............... 375/372 |
| 6,285,726 B1 * | 9/2001 | Gaudet ............... 375/376 |
| 6,336,159 B1 | 1/2002 | MacWilliams et al. |
| 6,373,289 B1 * | 4/2002 | Martin et al. ............ 326/93 |
| 6,606,360 B1 * | 8/2003 | Dunning et al. ........ 375/354 |
| 6,636,110 B1 * | 10/2003 | Ooishi et al. ............ 327/565 |
| 6,643,752 B1 * | 11/2003 | Donnelly et al. ........ 711/167 |
| 6,650,649 B1 * | 11/2003 | Muhammad et al. .... 370/402 |
| 2003/0120989 A1 * | 6/2003 | Zumkehr ............... 714/738 |

OTHER PUBLICATIONS

"XILINX: Using the Virtex Delay-Locked Loop"; XAPP132 Oct. 21, 1998 (Version 1.31); Advanced Application Note; pp. 1-14.

* cited by examiner

*Primary Examiner*—Betsy L. Deppe
(74) *Attorney, Agent, or Firm*—Meyertons Hood Kivlin Kowert & Goetzel, P.C.; Rory D. Rankin

(57) ABSTRACT

A device configured to recover and repeat source synchronous data. In one embodiment, the device is configured to receive source synchronous data via a first interface, recover the received data utilizing a corresponding received source synchronous clock signal, and transmit the recovered data and a corresponding clock signal in a source synchronous manner. In one embodiment, the device is configured to operate as a repeater without benefit of an internal clock signal. In addition, the device may be configured to remove data jitter and renew or restore amplitude to attenuated signals prior to retransmission.

23 Claims, 8 Drawing Sheets

SOURCE SYNCHRONOUS BUS REPEATER

BACKGROUND OF THE INVENTION

1. Field of the Invention

This invention is related to the field of digital communications and, more particularly, to the transmission of digital signals.

2. Description of the Related Art

The design of advanced digital communication systems requires careful attention to the reliable transmission and receipt of signals in order to ensure proper functioning. One popular design methodology is that of synchronous design. Generally speaking, synchronous designs utilize a central clock which is distributed to various parts of the design. While utilizing a synchronous approach may simplify certain aspects of the design process, this approach is not without its problems. One such problem is that of clock skew. Because a central clock signal may be distributed to various parts of a system via board traces, backplanes, interconnects, and the like, clock skew may exceed that which can be tolerated by registers and other elements. Consequently, design techniques to minimize clock skew must be utilized to ensure proper system functioning. An additional consequence of using the synchronous design approach and distributing a clock signal throughout a system is the inherent phase delay that may accumulate. In a design where higher frequencies and performance are desired, these delays ultimately may cause the synchronous design approach untenable.

Source synchronous designs utilize a different approach than the synchronous design approach in order to obtain higher performance. Source synchronous designs transmit both a clock signal and data from a transmitter to receiver. The receiver then uses the received clock signal to recover the data. Because the clock signal and data are transmitted from the transmitter to receiver in parallel, some of the problems of a widely distributed clock signal are avoided. Consequently, higher frequencies may be more reliably maintained. Also, many source synchronous designs may utilize both edges of a transmitted clock signal for the transmission of data. In this manner, even higher data throughputs may be achieved. Further, because both the clock signal and data are transmitted by a particular source, longer trace lengths may be supported.

While source synchronous designs may provide certain advantages over synchronous designs, they are not without their own problems. For example, the design must account for clock jitter due to noise. In addition, certain systems may require transmitting signals over relatively long distances. Even with the greater lengths which may be achieved using source synchronous designs, jitter and other signal degradation may limit the effective length of a transmission line. Further, signal degradation may also reduce the effective operating frequency which can be achieved.

What is desired is a method and mechanism for improving signal transmitting signals in source synchronous designs.

SUMMARY OF THE INVENTION

Other embodiments and details of embodiments will be described in the detailed description.

Generally speaking, a device is contemplated which is configured to repeat source synchronous data. In one embodiment, the device is configured to receive source synchronous data via a first interface, recover the received data utilizing a corresponding received clock signal, and transmit the recovered data and a corresponding clock signal in a source synchronous manner. In one embodiment, the device is configured to operate as a repeater without benefit of an internal clock signal. Further, in one embodiment, the received data may be attenuated and the retransmitted source synchronous data is transmitted with a restored amplitude.

BRIEF DESCRIPTION OF THE DRAWINGS

Other objects and advantages of the invention will become apparent upon reading the following detailed description and upon reference to the accompanying drawings in which.

Figure 1:
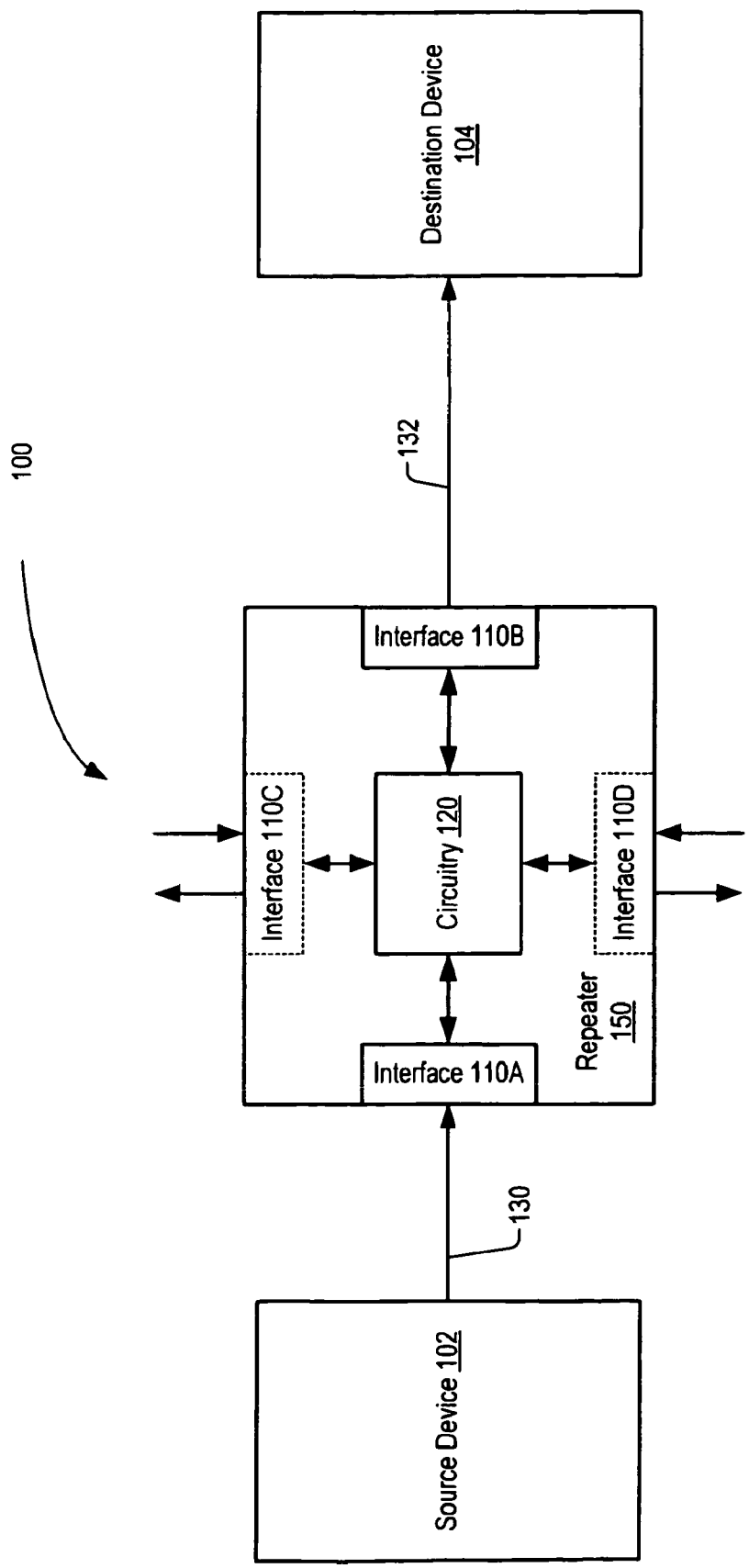
FIG. 1 illustrates one embodiment of a system employing a source synchronous repeater.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined be the appended claims.

DETAILED DESCRIPTION

FIG. 1 illustrates one embodiment of a source synchronous system 100 configured to transmit signals. In the example shown, a source device 102 is configured to convey signals to a destination device 104. Also shown in FIG. 1 is a retimer chip 150 coupled between source device 102 and destination device 104. Retimer chip 150 includes input port 110A which is coupled to receive source synchronous signals from source device 102 via bus 130. Retimer chip 150 also includes output port 110B which is coupled to convey source synchronous signals to destination device 104 via bus 132. Also included in retimer chip 150 is circuitry 120, and optional additional ports 110C and 110D.

In one embodiment, source device 102 and destination device 104 may be physically separated by such a distance that signal degradation precludes efficient signal transmission directly from source device 102 to destination device 104. Therefore, rather than directly coupling source device 102 to destination device 104, retimer chip 150 is coupled between the source 102 and destination 104 in order to improve the quality of the signal received by destination device 104. By improving the quality of the signal, higher transmission speeds and/or greater transmission distances may be achieved by system 100. Generally speaking, circuitry 120 in retimer chip 150 is configured to remove jitter in received signals, and amplify signals prior to retransmitting them.

Figure 2:
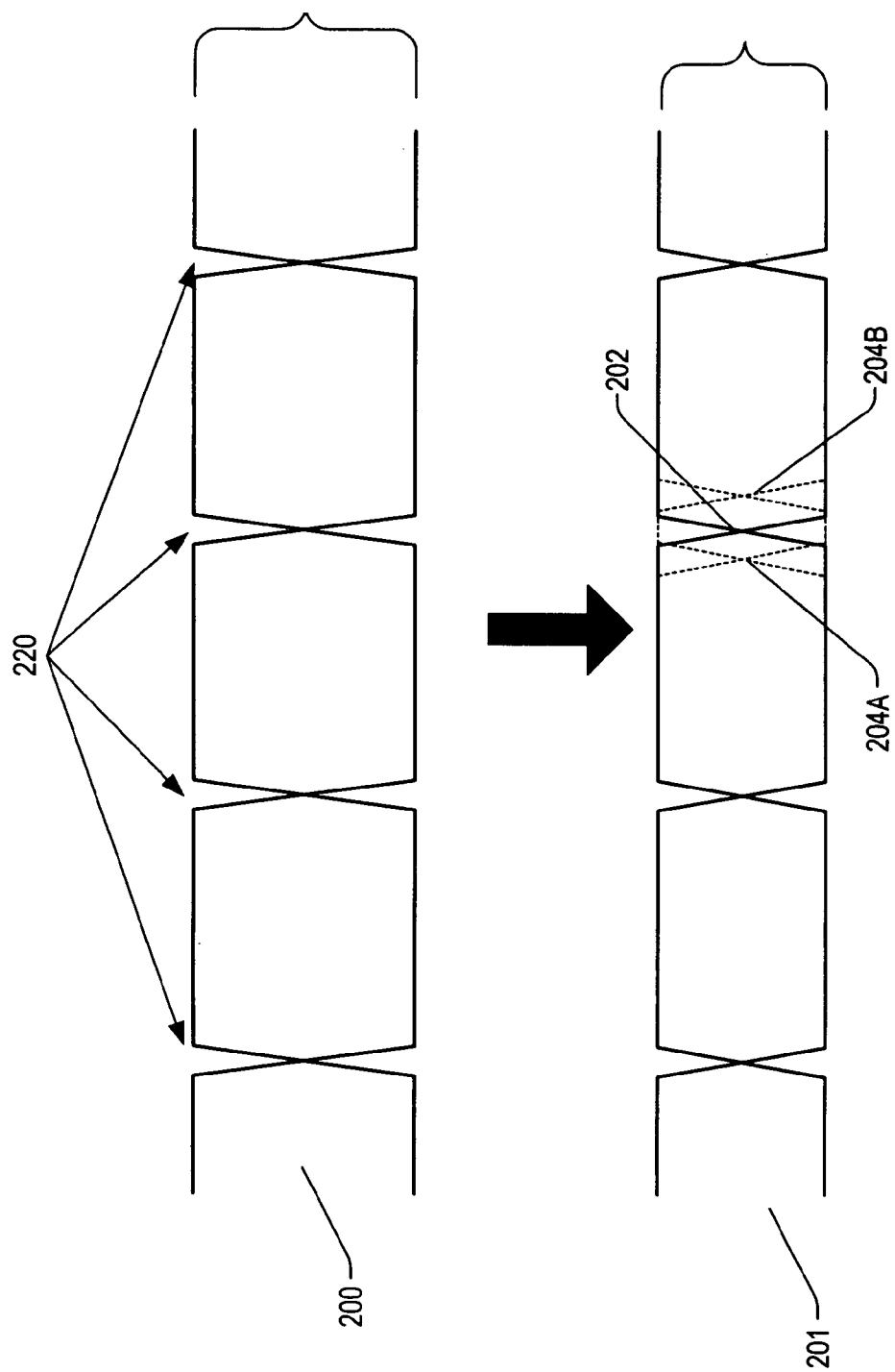
FIG. 2 shows an example of signal degradation.

FIG. 2 illustrates one example of signal degradation which may occur during transmission. Signal 200 illustrates an originally transmitted signal. Originally transmitted signal 200 is transmitted with a particular amplitude 210, and signal transitions occurring at particular times 220. Signal 201 illustrates one example of signal 200 after transmission and subsequent degradation. Due to noise, intersymbol interference, and/or impedance, signal 201 has a lower amplitude 212 than original signal 210. In addition, signal transitions 204A and 204B may not occur at times which correspond to the original signal 200. For example, transition 202 represents a transition which is timed according to the original signal 200. However, jitter may be present in the signal 201 which causes a transition to occur earlier 204A or later 204B than desired. Consequently, the overall integrity of signal 200 is degraded during transmission as illustrated by signal 201.

Figure 3:
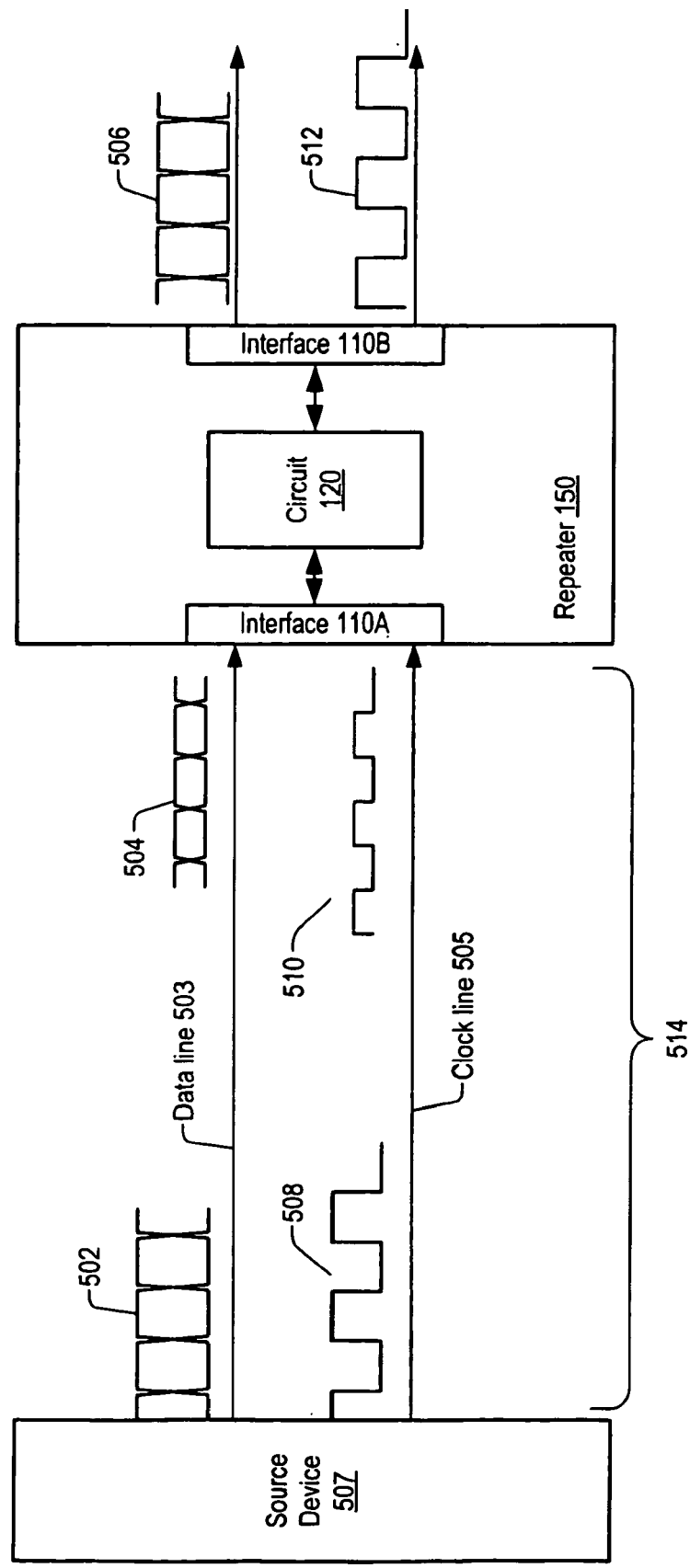
FIG. 3 illustrates one embodiment of repeater operation.

Turning now to FIG. 3, one embodiment of a repeater 150 and its function is illustrated. In the embodiment shown, repeater 150 is configured to receive a source synchronous signal via port 110A from device 507 and transmit a corresponding signal via port 110B. Circuit 120 is configured to control acquisition and transmission of the signals received and transmitted by repeater 150. Illustrated in FIG. 3 are a data line 503 and a clock line 505. A particular length 514 of each line 503 and 505 is indicated. Device 507 transmits signals 502 and 508 via lines 503 and 505 to repeater 150. Initially, signals 502 and 508 have a relatively good degree of integrity with to respect to their original amplitude and timing. However, after traveling along the length of lines 503 and 505, signal 504 which corresponds to the original signal 502 has reduced amplitude (is attenuated) and may include jitter. Similarly, signal 510 which corresponds to original signal 508 has reduced amplitude and may include jitter.

Generally speaking, if signal integrity becomes sufficiently degraded through attenuation or jitter, the system may cease to function properly. FIG. 3 illustrates the function of repeater 150 whereby degraded source synchronous signals 504 and 510 are received, but corresponding source synchronous signals 506 and 512 are repeated (transmitted) with improved signal integrity. In one embodiment, repeater 150 may improve and/or restore signal integrity by eliminating certain jitter components in received data and retransmitting signals with increased amplitude. Consequently, because of the improve signal integrity introduced by repeater 150, greater signal lines (or traces) and/or operating speeds may be achieved.

Figure 4:
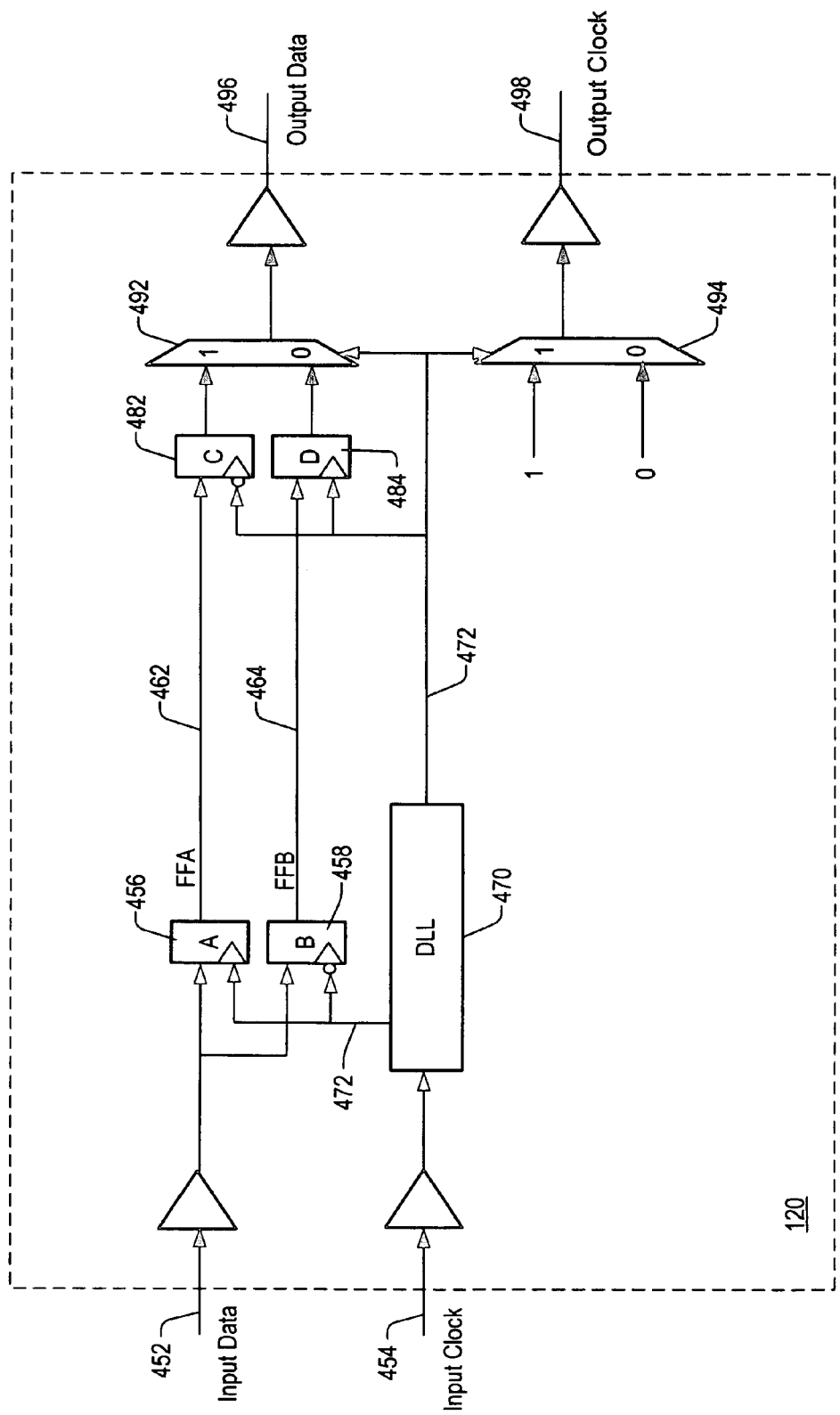
FIG. 4 illustrates one embodiment of a repeater.

FIG. 4 illustrates a portion of one embodiment of circuit 120. In the embodiment of FIG. 4, circuit 120 is configured to capture and repeat data on both edges of a clock cycle. Generally speaking, circuit 120 is configured to receive source synchronous signals 452 and 454, and transmit corresponding source synchronous signals 496 and 498. Circuit 120 includes latches 456, 458, 482 and 484. Latches 456 and 458 are configured to receive input data 452. A first circuit 470, a delay locked loop (DLL) in the example shown, is coupled to receive input clock 454 and output a clock signal 472 to latches 456, 458, 482 and 484. In an alternative embodiment, first circuit 470 may comprise a phase lock loop (PLL). Latches 458 and 482 are configured with inverted clock inputs. Latch outputs FFA 462 and FFB 464 are input to latches 482 and 484, respectively. Outputs from latches 482 and 484 are input to multiplexor (mux) 492. Another mux 494 is configured to convey either a logic high or a logic low signal. Both mux 492 and 494 are coupled to have output selected by clock signal 472. Finally, mux 492 is configured to convey output data 496, and mux 494 is configured to convey output clock 498.

As an overview, DLL 470 receives input clock signal 454 and conveys a corresponding clock signal 472. Latches 456 and 458 are configured to latch received input data 452 on alternate edges of the clock 472 cycle. Latches 482 and 484 are configured to latch, on alternate clock edges, stable signals FFA 462 and FFB 464 which are output from latches 456 and 458. Finally, data is transmitted from mux 492 concurrently with a clock signal 498 via mux 494.

Figure 5:
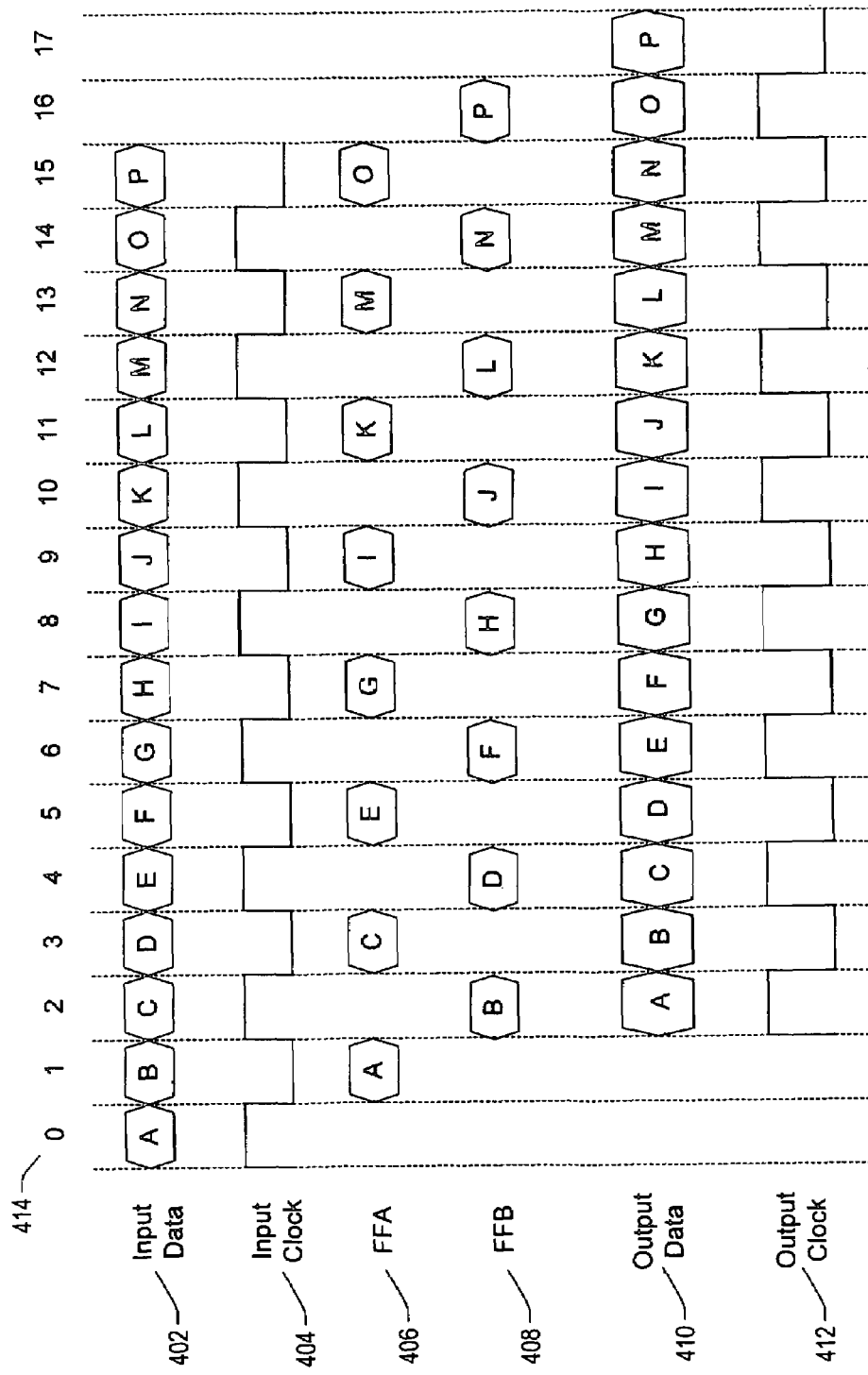
FIG. 5 illustrates one embodiment of the operation of the repeater of FIG. 4.

FIG. 5 illustrates operation of the circuit 120 in FIG. 4. FIG. 5 shows a series of clock cycles during which source synchronous data is both received and transmitted by circuit 120. In the example shown, 17 half clock cycles 414 are illustrated. During this time, input data 452, input clock 454 (corresponding to clock 472), latch output FFA 462, latch output FFB 464, output data 496, and output clock 498 are shown. At a first point in time 0, an input data A is received along with input clock 454. At time 0, latch 456 latches the data A. At a subsequent point in time 1, a second data B is received along with input clock 454. Data B is latched by latch 458 at time 1 on the falling edge of clock 454. Also at time 1, data A is stable as signal FFA 462 and latched by latch 482. Finally, at time 2, a third data C is received and latched by latch 456. Data B is stable as FFB 464 and latched by latch 484. Data A is then output 496 via mux 496 concurrently with a clock signal 498 reflecting the same state (logic high in this case) which was received with data A. The process then continues as above. In this manner, the input clock 454 is used to recover the attenuated source synchronous data 452, noise and attenuation in the data may be remedied, and the source synchronous data 496 and clock 498 retransmitted with little delay and few components.

Figure 6:
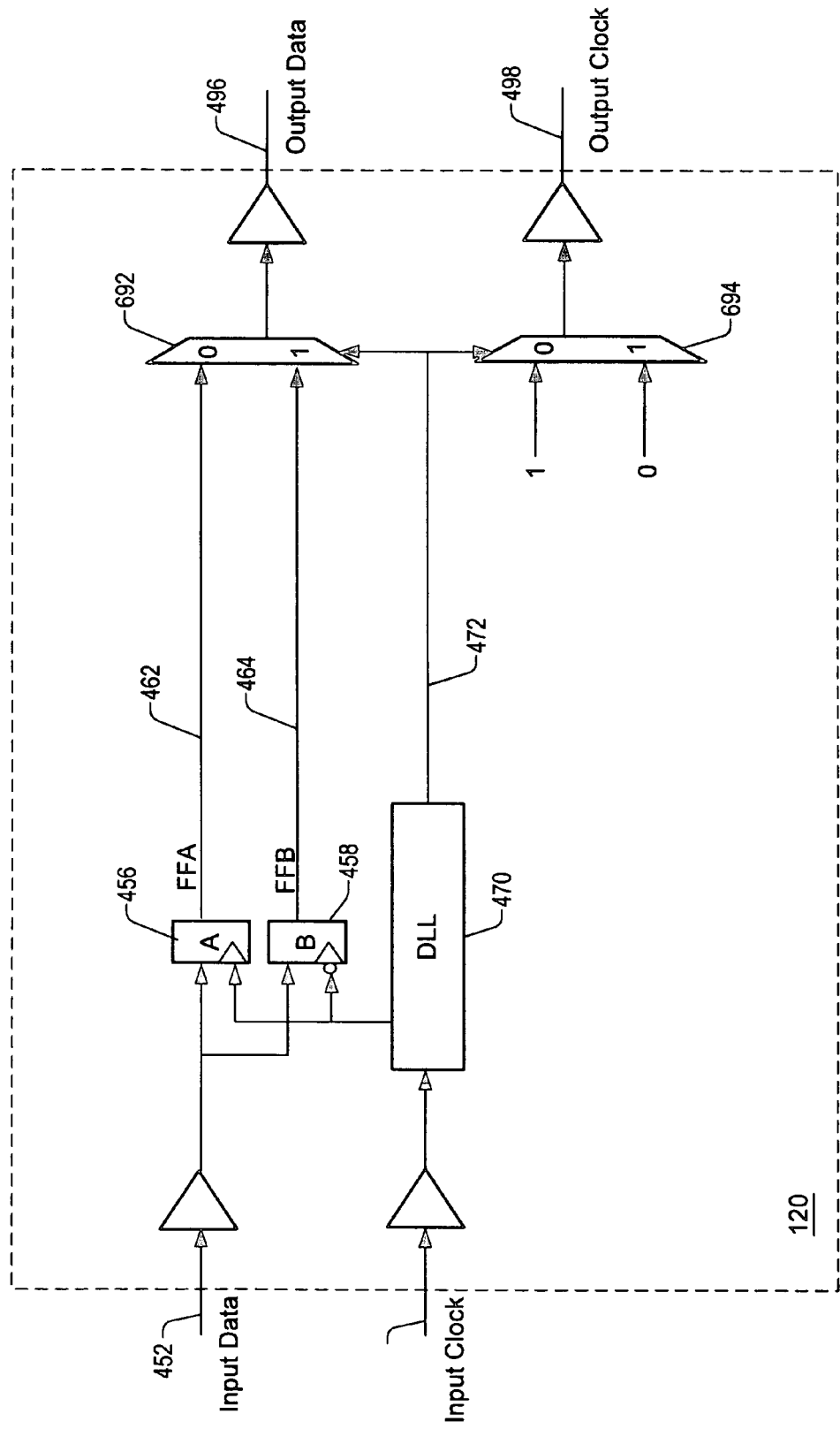
FIG. 6 illustrates one embodiment of a repeater.
Figure 7:
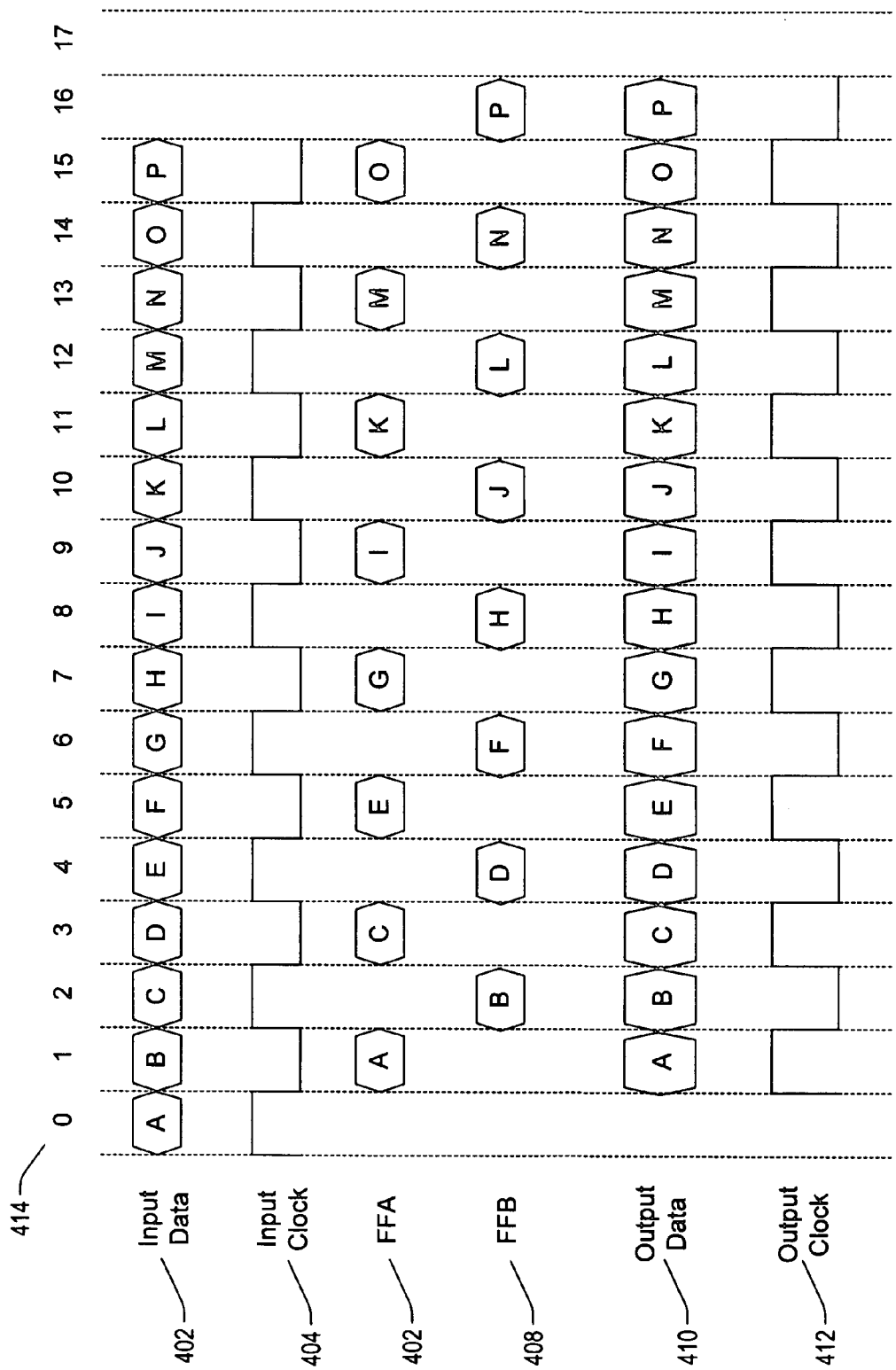
FIG. 7 illustrates one embodiment of the operation of the repeater of FIG. 6.

FIG. 6 illustrates an alternate embodiment of circuit 120. The embodiment of FIG. 6 is similar to that of FIG. 4, with a difference being that the embodiment of FIG. 6 does not include latches 482 and 484. In addition, muxes 492 and 494 have been replaced by muxes 692 and 694, respectively. Muxes 692 and 694 may be seen to have their inputs selected opposite to that of muxes 492 and 494. Signals FFA 462 and FFB 464 are coupled to mux 692. Operation of the embodiment in FIG. 6 is illustrated by FIG. 7. As may be seen in FIG. 7, operation is similar to that illustrated by FIG. 5, with an exception being that the output data 410 and output clock 412 are driven in the same half clock cycle that the data FFA 462 and FFB 464 are stable. Consequently, overall delay in the repeating process may be reduced by approximately half a clock cycle vis-à-vis the embodiment of FIG. 4. It is understood that various methods of signaling and capturing data are possible. For example, signals may be captured on rising clock edges, falling clock edges, during first or second phases, and so on. All such signaling methods are contemplated.

Figure 8:
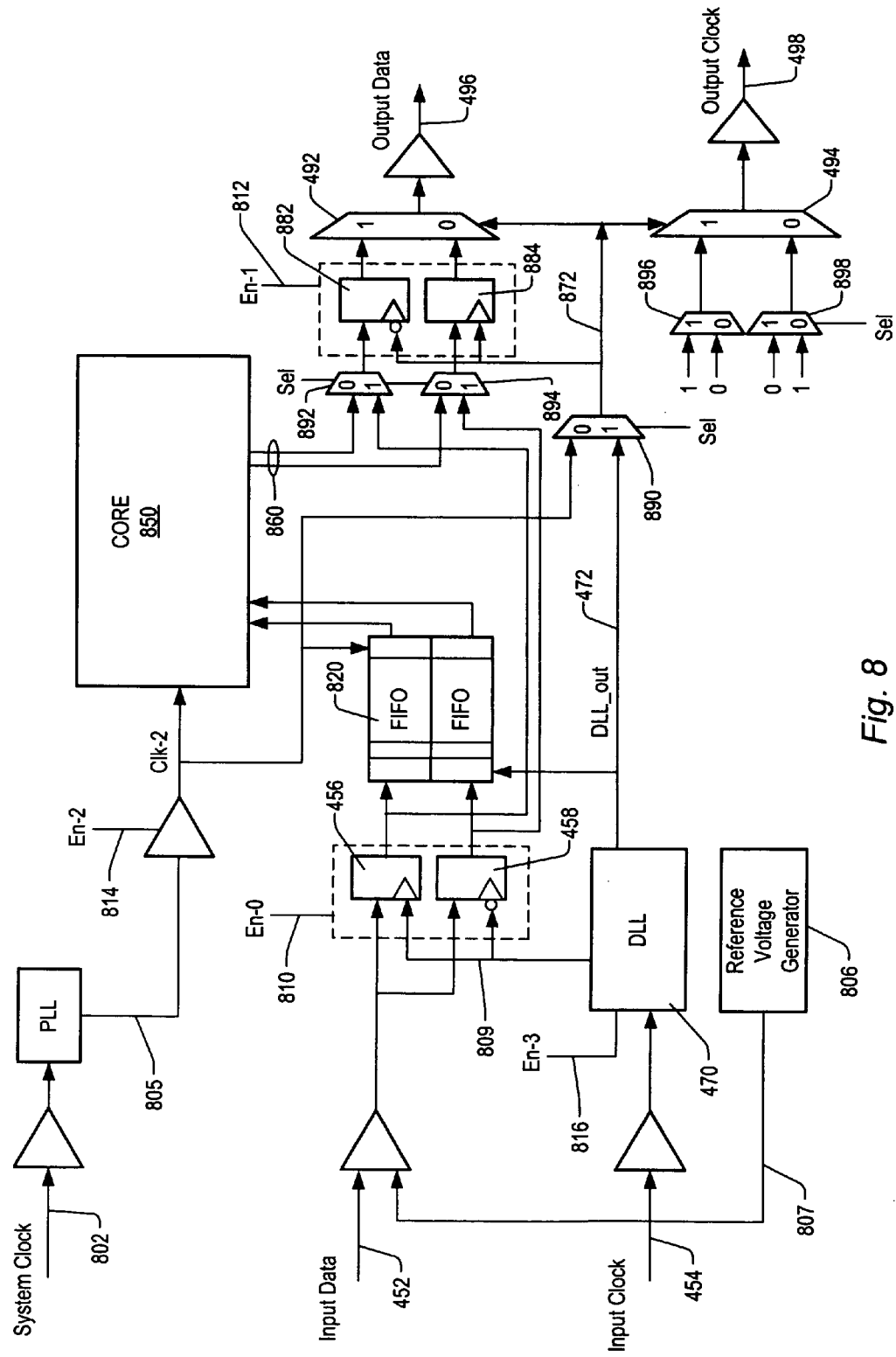
FIG. 8 illustrates one embodiment of a repeater configurable to operate in multiple modes.

Finally, FIG. 8 is a diagram illustrating an embodiment of repeater circuit 120 which is configurable to operate in either a repeater mode as described above, or a functional mode in which data is generated and/or processed. In one embodiment, functional modes may include a flow control mode, and/or an internal built in self test (IBIST) mode. As the repeater functionality described above may be utilized in a myriad of configurations, the embodiment of FIG. 8 is intended to be exemplary only. In addition to the components of FIG. 4, the embodiment of FIG. 8 may include a number of other components. Also included in the embodiment shown are a received system clock 802 coupled to a PLL 803. The signal 805 conveyed by PLL 803 may be either enabled or disabled via enable signal En-2 814 for use by the remainder of the circuit. Clock signal 805 is coupled to core logic 850, FIFO 820, and mux 890. Each of latches 456 and 458 may be enabled/disabled by signal En-0 810. Similarly, latches 882 and 884 may be enabled/disabled by signal En-1 812. DLL 816 may be enabled/disabled via signal En-3 816, and is coupled to FIFO 820 and mux 890. Core logic also provides input 860 to muxes 892 and 894. Outputs from muxes 892 and 894 are coupled to latches 882 and 884, respectively. Mux 890 output 872 is coupled to muxes 892, 894, 492, and 494. Finally, a select signal SEL is coupled to each of muxes 890, 892, 894, 896 and 898.

Referring now to FIG. 8, by setting selected signals appropriately, different modes of operation may be achieved. For example, in order to operate in a repeater mode as described above in FIGS. 4–5, the following signals may be set as indicated: SEL=1, En-0=enabled, En-1=enabled, En-2=disabled, En-3=enabled. In this manner, the system clock 802 is not distributed to the illustrated circuitry and operation is as described in the discussion above. In a second mode of operation, a functional mode of operation may be selected. As an example, one embodiment may include an IBIST mode configured to perform internal tests. As an illustration, to configure an IBIST mode, the following signals may be set as indicated: SEL=0, En-0=enabled and En-2=enabled. When operating in IBIST mode, core logic 850 receives system clock 805 and is configured to convey signals to DLL 470 and voltage generator 806. Core 850 may be configured to control DLL 470 and voltage generator 806 in order to generate a clock signal 809 and source synchronous test data 807 to latches 456 and 458. Source synchronous test data and corresponding clock signal may then be fed from latches 456 and 458 to FIFO 820, which subsequently conveys the stored data to core 850 for further test purposes. Further, one embodiment may include a flow control mode of operation. In order to enable a flow control functional mode, the following signals may be set as indicated: SEL=0, En-0=disabled, En-1=enabled, En-2=enabled. During flow control operation, core 850 receives system clock 805. Latches 882 and 884 are enabled and receive data from core logic 850 via muxes 892 and 894. System clock 805 is conveyed from mux 890 and used to clock both latches 892, 894 and select output from muxes 492 and 494.

It is noted that while IBIST and flow control modes are included in the discussion of functional modes above, these are intended to be exemplary only. Many functional modes are possible and are contemplated. As already mentioned, numerous alternative configurations employing the method and mechanism described herein are possible and are contemplated.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A repeater device configured to repeat source synchronous data, said device comprising:
   a first interface configured to receive source synchronous data comprising a first data and corresponding first clock signal;
   a second interface configured to transmit source synchronous data; and
   a circuit coupled to said first interface, wherein said circuit is configured to:
   utilize said first clock signal in order to recover said first data;
   generate a second clock; and
   transmit said recovered first data and a corresponding clock via said second interface in a source synchronous manner;
   wherein transmitting the recovered first data comprises selecting alternate samples of the recovered first data for transmission on alternate half cycles of said second clock; and
   wherein transmitting said corresponding clock comprises alternately selecting a logic high and a logic low for transmission on alternate half cycles of said second clock.

2. The device of claim 1, wherein said circuit comprises a first circuit configured to receive said first clock signal via said first interface, and generate said second clock.

3. The device of claim 2, wherein the first circuit is selected from the group consisting of: a delay locked loop and a phase locked loop.

4. The device of claim 2, wherein said device is configured to repeat said source synchronous data without using an internal clock signal.

5. The device of claim 1, wherein said circuit is further configured to receive a system clock signal, and wherein said circuit is further configured to operate in a functional mode utilizing a clock signal corresponding to said system clock signal to generate said second clock.

6. The device of claim 5, wherein said functional mode comprises a test mode, and wherein when said circuit is configured to operate in said test mode, said circuit is configured to utilize said system clock to generate source synchronous test data and a corresponding source synchronous test clock.

7. The device of claim 5, wherein said functional mode comprises a flow control mode, and wherein when said circuit is configured to operate in said flow control mode, said circuit is configured to utilize said system clock to generate the second clock.

8. The device of claim 1, wherein said recovered first data and a corresponding clock are transmitted with an amplitude which is greater than the amplitude of the received source synchronous data.

9. A method for repeating source synchronous data, said method comprising:
   receiving source synchronous data;
   receiving a source synchronous clock signal corresponding to said data;
   utilizing said clock signal to recover said data;
   generating a second clock; and
   transmitting said recovered data and a corresponding clock in a source synchronous manner;
   wherein transmitting said recovered data comprises selecting alternate samples of said recovered data for transmission on alternate half cycles of said second clock; and
   wherein transmitting said corresponding clock comprises alternately selecting a logic high and a logic low for transmission on alternate half cycles of said second clock.

10. The method of claim 9, further comprising receiving said clock signal at a first circuit, wherein said first circuit is configured to generate said second clock.

11. The method of claim 10, wherein said first circuit is selected from the group consisting of: a delay locked loop and a phase locked loop.

12. The method of claim 10, further comprising receiving a system clock signal, and operating in a functional mode utilizing a clock signal corresponding to said system clock signal to generate said second clock.

13. The method of claim 12, wherein said functional mode comprises a test mode, and wherein when said circuit is configured to operate in said test mode, said circuit is configured to utilize said system clock to generate source synchronous test data and a corresponding source synchronous test clock.

14. The method of claim 12, wherein said functional mode comprises a flow control mode, and wherein when said circuit is configured to operate in said flow control mode, said circuit is configured to utilize said system clock to generate the second clock.

15. The method of claim 10, wherein said recovered data and a corresponding clock are transmitted with an amplitude which is greater than the amplitude of the received source synchronous data and clock signal.

16. A source synchronous system comprising:
a source device configured to convey source synchronous data comprising a first data and corresponding first clock signal;
a repeater device coupled to said source device, wherein said repeater device comprises:
a first interface configured to receive said source synchronous data;
a second interface configured to transmit source synchronous data corresponding to said received source synchronous data; and
a control circuit configured to:
utilize said first clock signal in order to recover said first data;
generate a second clock; and
transmit said recovered first data and a corresponding clock via said second interface in a source synchronous manner;
wherein transmitting said recovered first data comprises selecting alternate samples of said recovered first data for transmission on alternate half cycles of said second clock; and
wherein transmitting said corresponding clock comprises alternately selecting a logic high and a logic low for transmission on alternate half cycles of said second clock; and
a destination device coupled to said repeater device, wherein said destination device is configured to receive source synchronous data from said repeater device.

17. The system of claim 16, wherein said control circuit comprises a first circuit configured to receive said first clock signal via said first interface, and generate said second clock.

18. The system of claim 17, wherein said first circuit is selected from the group consisting of: a delay locked loop and a phase locked loop.

19. The system of claim 18, wherein said repeater device is configured to repeat said source synchronous data without using an internal clock signal.

20. The system of claim 16, wherein said repeater device is further configured to receive a system clock signal, and wherein said control circuit is further configured to operate in a functional mode utilizing a clock signal corresponding to said system clock signal to generate said second clock.

21. The system of claim 20, wherein said functional mode comprises a test mode, and wherein when said repeater device is configured to operate in said test mode, said circuit is configured to utilize said system clock to generate source synchronous test data and a corresponding source synchronous test clock.

22. The system of claim 20, wherein said functional mode comprises a flow control mode, and wherein when said circuit is configured to operate in said flow control mode, said circuit is configured to utilize said system clock to generate the second clock.

23. The system of claim 16, wherein said recovered first data and a corresponding clock are transmitted with an amplitude which is greater than the amplitude of the received source synchronous data.

* * * * *